March 31, 1936. F. P. LACKINGER 2,035,753
BRAKING SYSTEM
Filed March 23, 1933 3 Sheets-Sheet 1
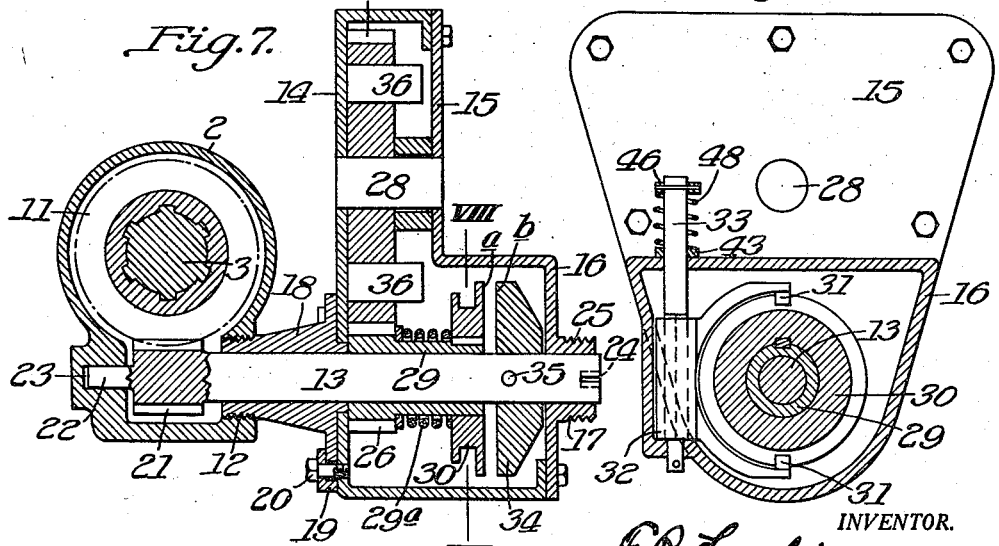

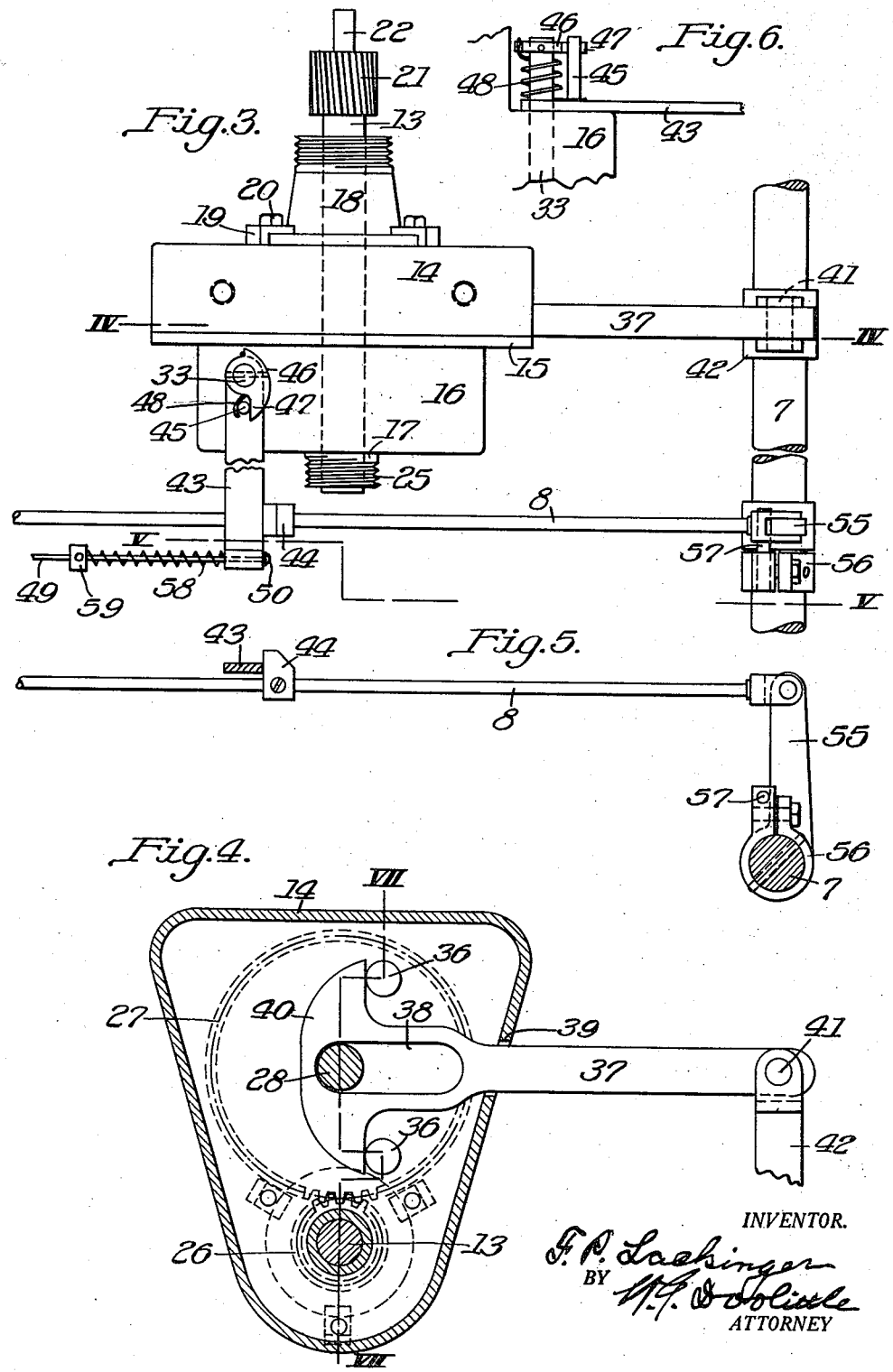

March 31, 1936.                F. P. LACKINGER                2,035,753
                                BRAKING SYSTEM
                          Filed March 23, 1933          3 Sheets-Sheet 3
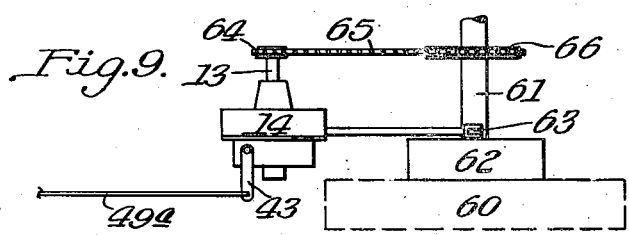
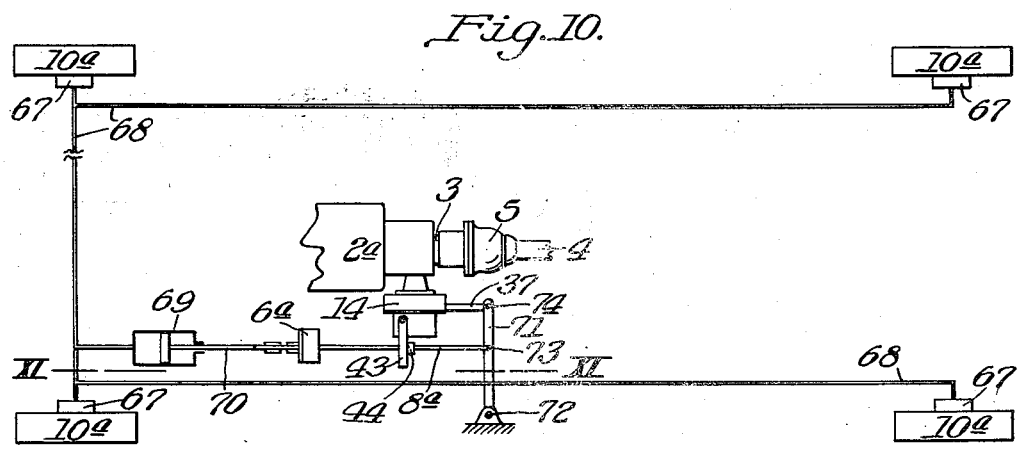
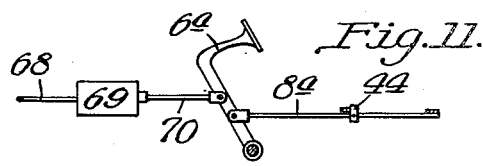
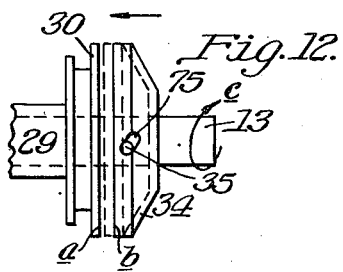
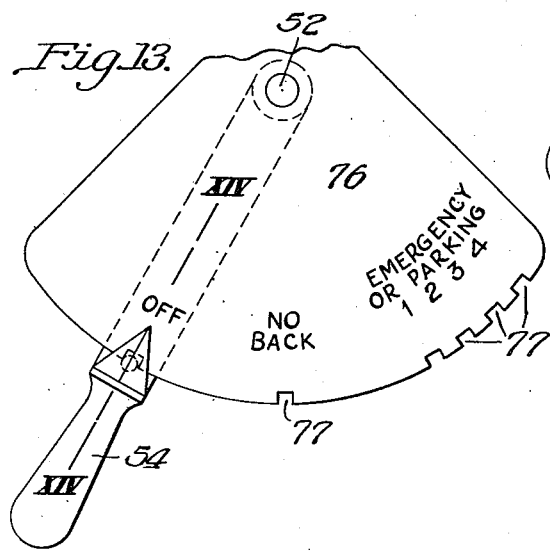
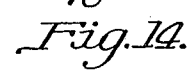
INVENTOR.
F. P. Lackinger
BY
ATTORNEY.

Patented Mar. 31, 1936

2,035,753

UNITED STATES PATENT OFFICE 2,035,753

BRAKING SYSTEM

Frank P. Lackinger, McKees Rocks, Pa.

Application March 23, 1933, Serial No. 662,269

12 Claims. (Cl. 188—140)

This invention relates to improvements in braking systems, and is particularly adapted to be employed with automotive vehicles, although I am not to be limited to such use, since it is applicable for use with other vehicles and/or machines.

My invention contemplates means adapted to be operatively associated with the brake or brakes of a vehicle or machine, wherein the braking effort applied to said brake or brakes is principally derived from the movement of such vehicle or machine, requiring a minimum of actual physical effort for the actuation thereof.

In automotive vehicles, and particularly those employing what are known in the art as mechanical and hydraulic brakes, the application and efficiency of such braking systems are largely dependent upon the skill and physical effort of the driver or operator. My invention may be applied to and/or incorporated in such braking systems, and is designed to cooperate with the moving or driving parts of the vehicle for applying the braking force by utilizing the motion of said parts.

In connection with the application of my invention to automotive vehicles, I also contemplate the use of my braking device as a positive emergency or parking brake for preventing forward or backward movement of the vehicle to which it is applied.

Further objects are, to provide means for preventing reverse or backward movement of the vehicle or machine to which it is applied; to provide a device which may be readily applied to existing braking systems, as for example, on automotive vehicles; and to provide in such a device a construction having a high degree of simplicity and efficiency and possessing durability.

Additional objects and advantages will become apparent from the following description, taken in connection with the accompanying drawings, wherein:

Fig. 1 is a diagrammatic plan view of a preferred application of my invention, showing the same embodied in the mechanical braking system of an automotive vehicle;

Fig. 2, a side elevational view of the construction of Fig. 1;

Fig. 3, an enlarged detail view;

Fig. 4, a section taken on the line IV—IV of Fig. 3;

Fig. 5, a part elevational and a part sectional view, the vertical section being taken on the line V—V of Fig. 3;

Fig. 6, a detail elevational view of the actuating lever of the device, particularly showing the resilient mounting thereof;

Fig. 7, a vertical section taken on the line VII—VII of Fig. 4;

Fig. 8, a vertical section taken on the line VIII—VIII of Fig. 7;

Fig. 9, a diagrammatic plan view showing a further application of my invention;

Fig. 10, a view similar to Fig. 1, showing an application of the invention incorporated with a hydraulic braking system;

Fig. 11, a sectional view taken on the line XI—XI of Fig. 10;

Fig. 12, a fragmentary elevational view of the friction members, particularly showing means for preventing reverse or backward movement of the vehicle or machine to which it is applied;

Fig. 13, an enlarged plan view of the emergency or parking brake lever and its associated indicating means; and Fig. 14, a detail section taken on the line XIV—XIV of Fig. 13.

The drawings illustrate applications of my invention to automotive vehicles, and Figs. 1 and 2 thereof show portions of the driving and braking mechanisms of such vehicles, and include a transmission 2 having a drive shaft 3 connected to a propeller shaft 4 by means of a universal joint 5. The transmission 2 is operatively connected with a motor or engine for driving the rear wheels of such vehicle through the propeller shaft 4, as will be readily understood.

The braking system of Fig. 1 is of the mechanical type and includes a pivoted foot pedal 6, connected with an equalizer shaft 7 by means of a rod 8. Suitable cables or rods 9 connect the equalizer shaft with the wheel brakes, diagrammatically indicated at 10 in Fig. 1, and which may be of the common internal expanding shoe type, or other and well known commercial forms of brakes, the specific construction of which is not shown, their parts and operation being well known in the art.

My invention is designed to be associated with the aforesaid braking equipment, and, in addition, is to be operatively connected in any suitable manner with the driving mechanism or moving parts of the vehicle. In substantially all of the present automotive vehicles, the drive shaft 3 mounts and drives a gear, as 11, positioned adjacent the rear end of the transmission 2, designed for driving a speedometer through the usual flexible shaft, which latter is connected to the transmission through a threaded opening 12 in line with the gear.

In applying my device to such constructions, I prefer to connect it with the said speedometer gear, but it may be associated and connected with one of a number of the driving or moving parts of such a vehicle.

In such preferred construction, I provide a shaft 13 rotatable in a housing or hollow body 14 and its cover 15, said cover having an offset portion 16 provided with a bearing 17 for one end of the shaft. The housing 14 is provided with a rotatable bearing member 18 for the shaft, the outer end of which is externally threaded for engagement with the threads 12 of the transmission 2, as in Fig. 7. Suitable L-clamps 19 having bolts or screws 20 are provided on the housing or body 14 for securing said bearing member 18 thereto.

The shaft 13 projects beyond the bearing member 18 and has an integral gear 21 thereon for engaging the gear 11. 22 designates a reduced terminal on said shaft for bearing in a socket 23 in the transmission case. The other end of the shaft 13 projects beyond the bearing 17 and is apertured at 24 for engagement by a flexible speedometer shaft, not shown, and bearing 17 is externally threaded for securing the end of such flexible shaft.

Freely mounted on the shaft 13, I provide a gear 26 in mesh with a second gear 27, the latter rotatable in the housing and cover on a shaft 28. The gear 26 has an extended sleeve portion 29, bearing on the shaft 13, on which is mounted a shiftable friction member 30 rotatable therewith and slidable thereon, as by means of a key 30a. The member 30 is preferably circumferentially grooved to receive the rounded terminals 31 of a bifurcated shifting member 32, the latter being actuated by means of a shaft 33, as hereinafter described. Member 30 has a flat friction face a designed for engaging the friction face b of a second member 34 positioned adjacent thereto, the said member 34 being secured to and rotatable with the shaft 13, as by means of a through pin 35. A spring 29a extends between the gear 26 and the slidable member 30, for urging said member 30 towards the friction member 34.

The gear 27 carries a pair of spaced pins or stops 36 projecting from one face thereof, and extending between the pins is a transverse brake pull rod 37 in slotted sliding engagement at 38 with the gear shaft 28. This rod extends through an opening 39 in the housing 14. Pull rod 37 at one end extends beyond the pins 36, and is provided with a terminal head 40 disposed in the rotative path of the pins, while the opposite end of the rod projects rearwardly beyond the housing 14 for pivotal engagement at 41 with a lever 42 secured to and rotatable with the brake equalizer shaft 7.

The movements of the friction engaging members 30 and 34 relatively to each other and the maintenance of said members out of operative engagement until it is desired to apply the brakes, is effected by the cooperative actions of the spring 29a and means including an operating lever 43 connected to shaft 33, the said lever 43 being moved by reason of its contact with an abutment 44 mounted on rod 8.

In braking, the operator depresses the foot pedal 6 a slight amount, thereby moving the operating lever 43 to rotate its shaft 33 and move the friction member 30 toward the member 34, said members 30 and 34 being held in frictional contact by means of the spring 29a. Since the vehicle is in motion, the shaft 13 is rotating, due to its connection with the driving or moving parts, as described, and therefore friction member 34 is in motion. Engagement of the friction faces a and b will rotate the friction member 30 and thereby effect a rotative movement of the gears 26 and 27, bringing one or the other of the pins or stops 36 into engagement with the terminal head 40 of the pull rod 37, depending upon the direction of rotation of the vehicle-driving mechanism.

The frictional contact of the members 30 and 34 may be varied, depending upon the amount of movement of the foot pedal 6, and is evenly applied through the action of the spring 29a, to effect continued rotative movement of the gear 27 and its pins 36, thereby moving the pull rod 37 a sufficient distance to rotate the equalizer shaft 7 and actuate the brakes 10 by tensioning their rods or cables 9.

For example, when it is desired to merely retard the speed of the vehicle, the pedal 6 is depressed a slight amount, thereby causing a slight movement of the pull rod 37, there being but a small percentage of the rotative effort of the driving or moving parts imparted to the member 30 from the member 34, and hence to the pull rod 37. However, in stopping the vehicle, the pedal is depressed further to permit the full force of the spring 29a to urge the member 30 into contact with the member 34, and thereby transmit a greater percentage of the rotative effort of the driving mechanism to the pull rod 37 for setting the brakes 10.

The action just described may be had where the lever 43 is directly or positively connected to its shaft 33. However, I prefer to provide a spring mounting or attachment for the said lever on its shaft, wherein the lever is freely rotatable on the shaft and is provided with a projecting pin abutment 45 spaced from and parallel to said shaft 33. A second lever or pawl 46 is secured to the outer end of the shaft in spaced relation to the lever 43, and is formed with an abutment or shoulder 47 for normally engaging the pin 45. A tension spring 48 is provided on the shaft between the lever and pawl, having one end thereof bearing on the pawl, and its other end engaging the pin 45 in such a manner as to normally maintain the pawl abutment 47 in contact with said pin.

The tension and arrangement of the spring 48 is such as to permit the lever 43 to move its shaft 33 to engage the friction members under the action of the spring 29a by the initial depression of the foot pedal 6. However, when it is desired to increase the braking force so as to effect a quick stop, a greater movement of the foot pedal will cause the pawl 46 and the lever 43 to separate, thereby increasing the tension of the spring 48, which increased force is transmitted from said pawl through the shaft 33 to the friction members 30 and 34, thereby virtually increasing the effect of the spring 29a to provide a more positive frictional engagement of said members.

From the foregoing, it will be seen that with my invention very little physical effort on the part of the operator in applying the brakes is required. The parts also cooperate as a mechanical booster means utilizing rotative power from the driving or moving parts of the vehicle for increasing the braking effort upon depressing the foot pedal.

My invention further has particular advantage and application as a positive emergency or parking brake, and for this purpose, a wire or rod 49 is slidable in the outer end of the lever 43 and has a headed terminal 50 for engaging the lever. Various means may be employed for manipulating said wire 49. For example, I have shown the same connected to a lever 51 on the lower end of a rod 52 extending through the steering column or post 53, and having a hand lever 54 secured thereto on the steering wheel.

By moving the hand lever 54, the lever 43 is moved to bring the friction member 30 into engagement with the member 34. Movement of the vehicle either forward or backward will cause engagement of the terminal 40 by one or the other of the pins 36, depending upon the direction of movement, and thereby actuate the pull rod 37 to set the wheel brakes 10 as before. The device will then remain in braking position until the lever 54 is moved to release position, thereby releasing the lever 43 and the friction members.

To prevent interference by the brake rod 8 and its pedal 6 when employing the device as an emergency brake, the said rod is connected with the equalizer shaft 7 by a lever 55 freely mounted thereon. A collar 56 is secured to and rotatable with said shaft, and has a transverse arm or pin 57 extending in the path of the lever 55. Hence, when applying the device as an emergency brake, movement of the pull rod 37 as described will not interfere with the brake rod 8 and its lever 55, since the shaft 7 will be rotated by the pull rod and the pin 57 moved away from said lever 55.

In order to provide for a return movement of the parts to inoperative or non-braking position and to maintain the same in such position, a compression spring 58 is carried by the wire 49, disposed between the lever 43 and a spaced abutment or collar 59 secured to the wire, as in Fig. 3. Thus, in ordinary foot braking, the spring 58 being stronger than the spring 29a, the lever 43 will be returned to inoperative position upon releasing the foot pedal 6. When employed as an emergency or parking brake, the device will be released and returned to non-braking position by the positive retraction or return movement of the wire 49 by means of the hand lever 54 and its associated mechanism on the steering column.

As hereinbefore stated, my invention may be adapted to various other types of vehicles and machines, and in Fig. 9, I have shown it associated with a moving or rotating part 60 driven by or movable with a member or shaft 61, and having a brake 62 of any suitable form. For example, the member 60 may be the wheel of a traction or trolley car rotatable with its axle 61.

In this form, the outer end of pull rod 37 is pivotally connected at 63 with a suitable lever, cam, or other brake operating means, and the operating lever 43 is provided with a wire or rod 49a which may extend within convenient reach of the operator for positive forward and return movement thereof, as desired. The shaft 13 in this instance extends beyond the body 14 and is provided with a sprocket 64 for rotation thereof by means of a chain 65, driven by a sprocket 66 on the wheel axle or member 61. In this manner, the movement of the vehicle, or more particularly of the wheel and axle thereof, will be applied as hereinbefore described, through the medium of the friction members, to actuate the pull rod 37 and apply the brake 62.

Figs. 10 and 11 illustrate the application of my invention to a well known automotive hydraulic braking system, having wheel brakes 10a provided with actuating means or cylinders 67 connected by means of fluid conduits 68 with a master cylinder 69. The piston of the master cylinder is connected by its rod 70 with the foot pedal 6a.

In this form, the invention may be applied to the vehicle transmission 2a as before, and the operating lever 43 arranged to be moved by means of a brake rod 8a from the pedal 6a, by the abutment 44 on said rod. An auxiliary lever 71 may be provided pivotally mounted at 72 on the frame or body of the vehicle, and having connections 73 with the brake rod 8a and 74 with the pull rod 37 of the device. Thus, the movement of the pedal 6a will actuate the device as before, causing the braking effort derived from the movement of the vehicle to be imparted to the pedal 6a and thence to the piston in the master cylinder, for displacing the fluid and actuating the brakes 10a.

It is desirable to include means for preventing reverse or backward movement of the vehicle, as, for example, when such vehicle is stopped while advancing up a grade or slope. Heretofore, with an automotive vehicle equipped with the usual braking means, the operator experiences considerable difficulty and inconvenience when required to stop the vehicle during such movement upgrade, due to the fact that both the clutch and brake pedals must be depressed to prevent backward movement of the vehicle, and when it is desired to again advance the vehicle, undesirable backward movement often occurs due to the release of the brake pedal by the operator in order to operate the accelerator.

To obviate this inconvenience and possible hazard, I provide an adjustable mounting for the friction member 34 on its shaft 13, including an inclined through slot 75 for receiving the outer ends of the pin 35. Assuming in Fig. 12 that a backward movement of the vehicle causes the shaft 13 to move in the direction of the arrow c, it will be seen that such rotation, imparted to the pin 35, will cause the member 34 to be traversed toward its complementary friction member 30, while continuing to rotate as long as the vehicle is moving backward. The contact of the faces a and b of the friction members against the tension of the spring 29a will actuate the pull rod 37 to set the wheel brakes and stop the vehicle, independently of any movement of the brake pedal. When the vehicle is again advanced, the member 34 moves outwardly and the pin 35 engages the bottom of its slot, and the other braking operations may be effected, as herein described.

For the purpose of controlling the non-backing feature, I have provided a dial or indicator plate 76 for the hand lever control 54, this dial preferably being secured or mounted on the steering post of the car in any suitable manner. A portion or edge of the dial is provided with a plurality of notches 77 determining various degrees of rotation of the hand lever 54, and the lever has a spring-actuated latch or ball 78 cooperating to retain it in position when in register with the notches. In addition, the dial may be provided with suitable indicia, as shown in Fig. 13, indicating the various braking conditions corresponding to the different notches 77, or positions of the lever 54.

When the lever 54 is in the "Off" position, the friction members 30 and 34 are held in spaced relation a sufficient distance to permit the movement of the foot pedal 6 to actuate the brakes, but at the same time, the space between said friction members is slightly greater than the travel of the member 34 by means of its inclined slot 75, thereby permitting the vehicle to be driven in reverse gear without interference by means of the non-backing means.

However, when it is desired to apply the non-backing means, the lever 54 is moved on the dial 76 to the "No-back" position, thereby bringing the friction member 30 nearer the member 34, whereby rotation of the shaft 13 in the direction c by a rearward movement of the vehicle will cause member 34 to contact member 30 and apply the brakes of such vehicle.

By advancing the lever 54 further to the position of "Emergency or parking", various degrees of emergency or parking brake may be had, in the manner hereinbefore described.

I claim:

1. In a braking system for vehicles and the like, the combination with a brake, of a braking means having a pull rod connected with the brake, a friction member operable by a movement of the vehicle, a second friction member for actuating the pull rod, a spring for normally urging a movement of one of the friction members towards the other, means for restraining movement of the second friction member by the spring, and a second spring operable with said first spring when the friction members are in contact.

2. In a braking device of the character described, the combination with a wheel brake, of a rotatable shaft, a gear freely mounted thereon, a friction member rotatable with the gear, a second friction member rotatable with the shaft, a second gear meshing with the first gear and provided with a projecting pin, a brake pull rod connected with the brake, said rod being mounted for sliding movement and having a terminal head disposed in the rotative path of said pin, a brake pedal, a brake rod connected with said brake and pedal, an actuating lever for engaging the friction members, said lever being disposed in the path of and actuated by the brake rod, and means permitting relative movement of the brake and pull rods.

3. In a braking device of the character described, the combination with a wheel brake, of a rotatable shaft, a gear freely mounted thereon by means of an extended sleeve, a friction member slidable on and rotatable with said sleeve, a spring for the friction member, a second friction member rotatable with the shaft, a second gear adapted to be driven by the first gear, a brake pull rod connected with the brake, said rod being mounted for sliding movement and having a terminal head, means on the second gear for engaging the head of the pull rod, a brake pedal, a brake rod connected with said brake and pedal, an actuating lever for engaging the friction members, said lever being disposed in the path of and actuated by the brake rod, and means permitting relative movement of the brake and pull rods.

4. In a braking device of the character described, the combination with a wheel brake, of a rotatable shaft, a gear freely mounted thereon by means of an extended sleeve, a friction member slidable on and rotatable with said sleeve, a spring for the friction member, a second friction member, a second gear adapted to be driven by the first gear and having spaced pins projecting therefrom, a slidable brake pull rod connected with the brake, said rod extending between the pins and having a terminal head disposed in the rotative path of said pins, a brake pedal, a brake rod connected with said brake and pedal, an actuating lever for engaging the friction members, said lever being disposed in the path of and actuated by the brake rod, and means permitting relative movement of the brake and pull rods.

5. In a braking device of the character described, the combination with a wheel brake, of a rotatable shaft, a friction member slidable thereon, a spring for said member, a second friction member fixed on the shaft, a rotatable member adapted to be driven by said first friction member and having projecting means thereon, a brake pull rod connected with the brake and having a terminal head disposed in the rotative path of said means, a brake pedal, a brake rod connected with said brake and pedal, an actuating lever for shifting said first friction member in and out of engagement with the other friction member, said lever being disposed in the path of and actuated by the brake rod, and means permitting relative movement of the brake and pull rods.

6. In a braking device of the character described, a rotatable shaft, a friction member slidable thereon, a spring for said member, a second friction member fixed on the shaft, a rotatable member adapted to be driven by said first friction member and having projecting means thereon, a brake pull rod having a terminal head disposed in the rotative path of said means, and means for shifting said first friction member in and out of engagement with the other friction member, said means including an operating lever and a shifting member, a shaft for said member and lever, and spring means for imparting movement of the lever to the shaft and shifting member.

7. In a braking device of the character described, a rotatable shaft, a friction member freely slidable thereon, a spring for said member, a second friction member fixed on the shaft, a rotatable member adapted to be driven by said first friction member and having projecting means thereon, a brake pull rod having a terminal head disposed in the rotative path of said means, and means for shifting said first friction member in and out of engagement with the other friction member, said means including a shifting member and a shaft, a pawl fixed to the shaft, an operating lever freely mounted on the shaft and having an abutment for engaging the pawl, and a spring disposed between the pawl and lever for normally maintaining the pawl in contact with the abutment.

8. In a braking device of the character described, a rotatable shaft, a brake pull rod, and friction means operable by the shaft for moving the pull rod, said friction means comprising a pair of friction members, one of said friction members having a cooperating pin and slot connection with the shaft for shifting the last mentioned friction member into contact with the other friction member.

9. In a braking device of the character described, a rotatable shaft, a rotatable member having a pin projecting therefrom, a brake pull rod having a terminal head disposed in the rotative path of said pin, and a pair of friction members for rotating said members, one of said friction members having a cooperating pin and slot connection with the shaft for shifting said friction member into contact with the other friction member.

10. In a braking system for vehicles and the like, the combination with a brake, of a braking device having a pull rod connected with the brake, a pair of friction members one of which is operable by a movement of the vehicle for actuating the pull rod, resilient means for urging a movement of one friction member towards the other, means for resisting said movement, an actuating lever for the braking device associated with one of said friction members for shifting said member into contact with the other friction member, resilient means cooperating with the first resilient means when the friction members are in contact, a spring for normally maintaining said lever in inoperative position, a foot pedal for moving the actuating lever, and means for moving said actuating lever independently of the foot pedal.

11. In a braking system for vehicles and the like, the combination with a brake, of a braking device connected with the brake, a friction member operable by a movement of the vehicle, a second friction member for actuating the braking device, resilient means for normally urging a movement of one of the friction members towards the other, means for restraining movement of the second friction member by the resilient means, and a second resilient means operable with the first resilient means when the friction members are in contact.

12. In a braking system for vehicles and the like, the combination with a brake, of a braking device connected with the brake, a pair of friction members one of which is operable by a movement of the vehicle for actuating the braking device, resilient means for urging a movement of one friction member towards the other, means for resisting said movement, an actuating lever for the braking device associated with one of said friction members for shifting said member into contact with the other friction member, resilient means cooperating with the first resilient means when the friction members are in contact, a foot pedal for moving the lever, a rod for moving the lever independently of the foot pedal, and means for securing said rod in fixed position.

FRANK P. LACKINGER.